Aug. 9, 1966  J. J. SCHOLTEN  3,265,370
PACKAGED UNIT WATER AERATION AND FILTRATION APPARATUS
Filed Oct. 12, 1965  3 Sheets-Sheet 1
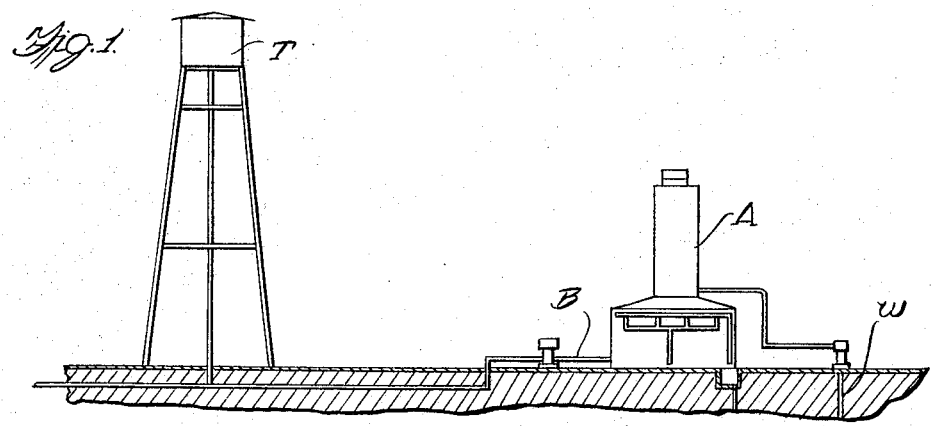
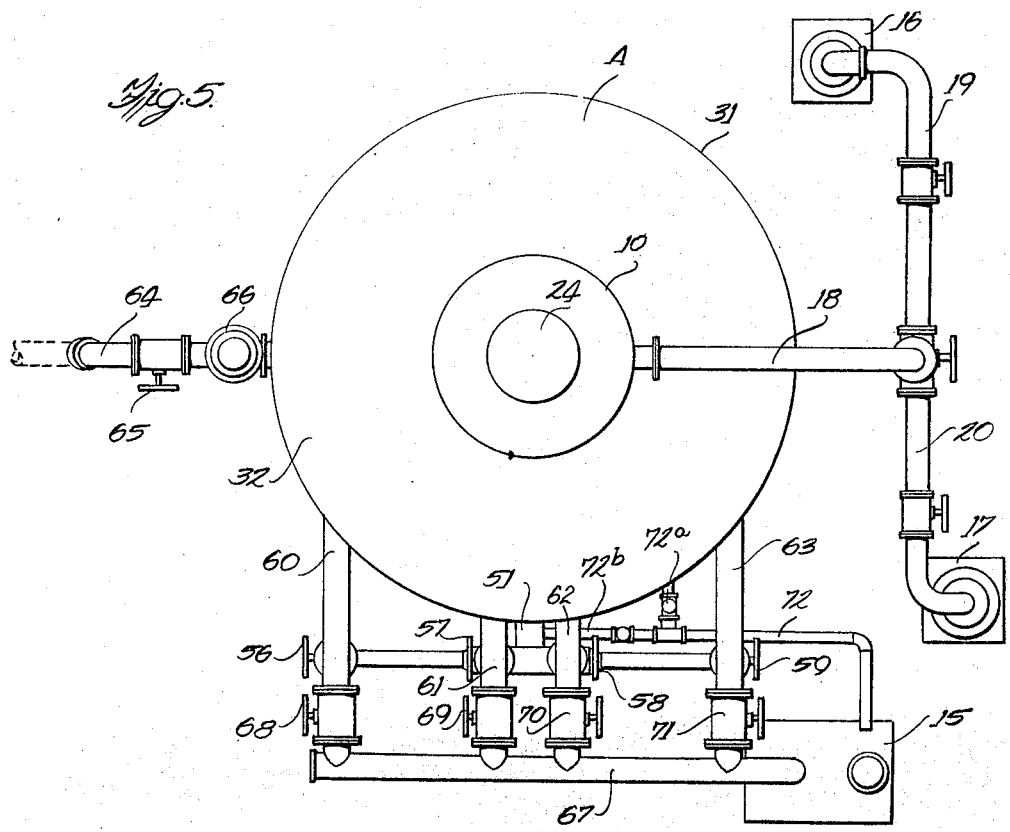

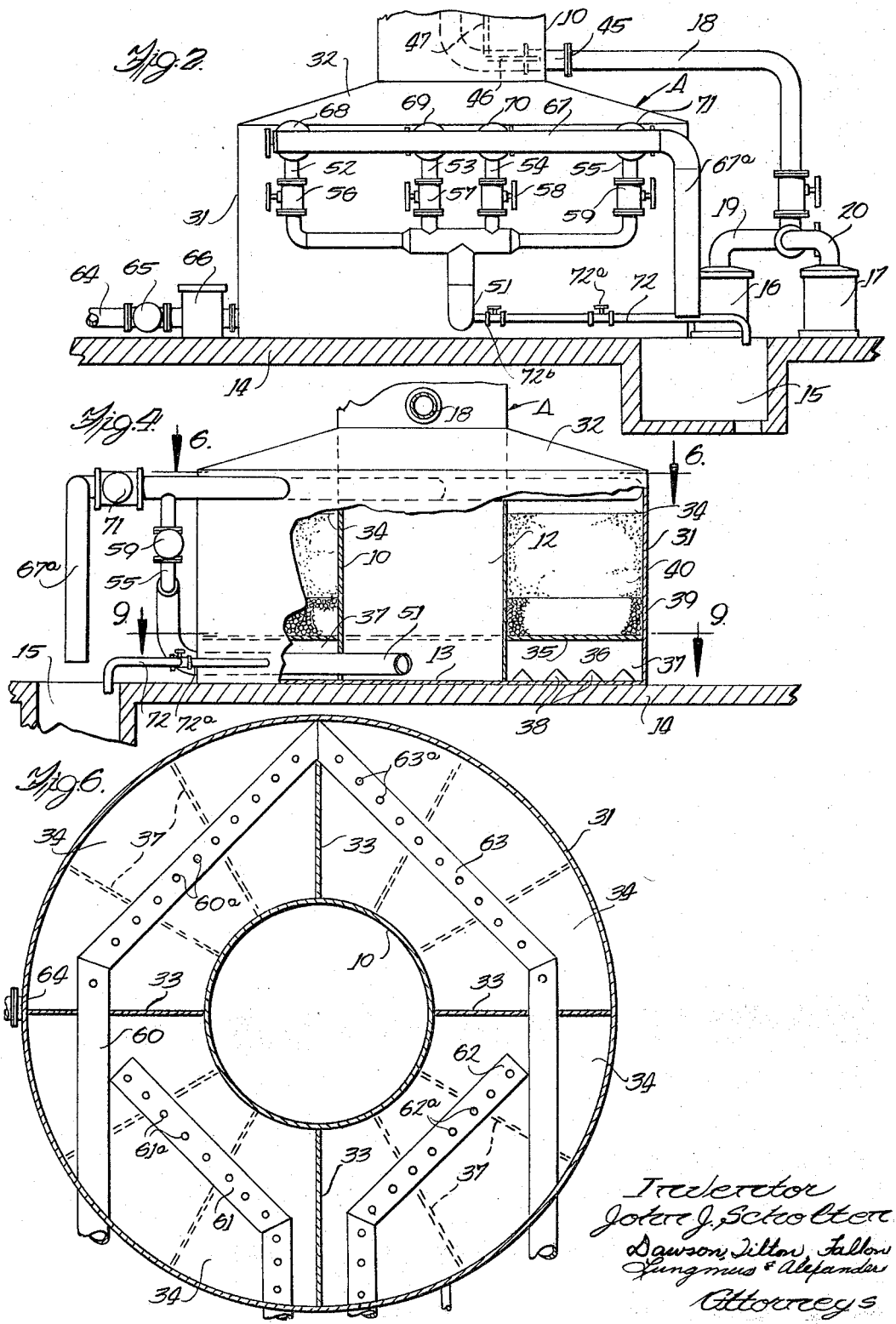

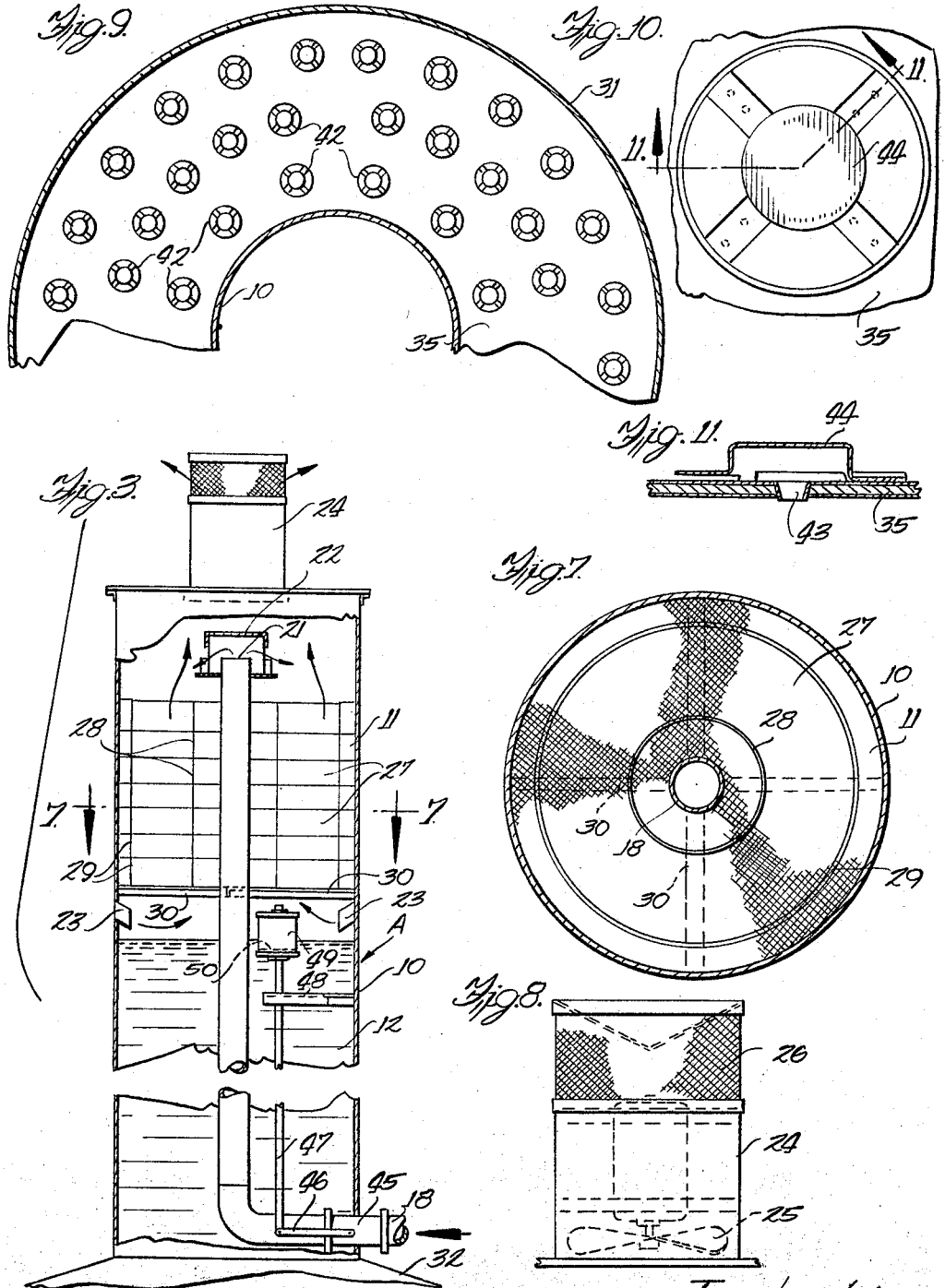

United States Patent Office 3,265,370
Patented August 9, 1966

3,265,370
PACKAGED UNIT WATER AERATION AND FILTRATION APPARATUS
John J. Scholten, Ames, Iowa, assignor to General Filter Company, Ames, Iowa, a corporation of Iowa
Filed Oct. 12, 1965, Ser. No. 500,480
9 Claims. (Cl. 261—3)

This application is a continuation-in-part of my co-pending application Serial No. 237,177 filed November 13, 1962.

This invention relates to a packaged unit water aeration and filtration apparatus, and more particularly to a unitary or package-type apparatus for the sequential treatment of water by aeration, post-aeration reaction, and filtration. Reference is also made to my co-pending application Serial No. 291,563, filed June 28, 1963.

The apparatus of this invention has particular utility for use by municipalities and industries in treating water obtained from wells or infiltration galleries, at rates of from 50 to 500 or 1,000 gallons per minute. It will be apparent, however, that the invention can also be advantageously employed in other applications, as well as at higher flow rates.

In preparing water from wells or infiltration galleries for distribution to homes or for use in industrial processes it is frequently desirable to process the water to remove dissolved gases such as carbon dioxide, hydrogen sulphide, and methane, while at the same time introducing air into the water for the purpose of oxidizing dissolved minerals such as iron and manganese. Such aeration processes are commonly carried out in a separate apparatus from the filtration unit. After aeration, the water is then subjected to filtration to remove the metals which have been insolubilized by the oxidation. Desirably, the aerated water is held in a detention tank to permit further oxidation reactions prior to filtration. The use of such multiple pieces of equipment can be prohibitively expensive when the volume of water being treated is relatively small, such as at treatment rates of 50 to 1,000 gallons per minute, and therefore many small municipalities and industrial users have been forced to tolerate dissolved gases and a high mineral or iron content. Such water can be objectional in taste, and can produce staining of clothes. Industrially, the dissolved gases can be corrosive, and the mineral or iron content may interfere with industrial processes.

It is, therefore, a general object of this invention to provide a water-treating apparatus which accomplishes aeration, detention, and filtration, and which is applicable to the treatment of water at relatively low flow rates. In this connection, a more specific object is to provide a water-treating apparatus of the character described which is adapted to be manufactured as a prefabricated or packaged unit wherein the unitary apparatus includes the necessary components for aeration, detention, and filtration. A further object is to provide a combination aeration, detention, and filtration apparatus wherein the processing steps are automatically integrated in the desired sequence so that raw or untreated water can be continuously introduced into the apparatus while the aerated, reacted, and filtered water is continuously removed. Another object, relating specifically to a preferred embodiment of the invention, is to incorporate means in an apparatus of the character described for back-washing the filter cells with filtered water at a higher rate than the normal filtration rate without disrupting the filtration operation in the cells not being back-washed, a reserve supply of water being provided for this purpose. Further objects and advantages will be indicated in the following detailed specification.

The invention is shown in an illustrative embodiment in the accompanying drawing, in which:

FIGURE 1 is a flow diagram showing the water-treating apparatus of this invention incorporated in a municipal or industrial system;

FIGURE 2 is a front elevational view of the water-treating apparatus of FIGURE 1 showing only the lower portion of the apparatus;

FIGURE 3 is a front elevational view of the same apparatus, part of the elements being shown in section;

FIGURE 4 is a rear elevational view of the lower portion of the apparatus, with part of the elements shown in section;

FIGURE 5 is a top plan view of the apparatus;

FIGURE 6 is a sectional plan of the lower portion of the apparatus taken on line 6—6 of FIGURE 4;

FIGURE 7 is a sectional plan view of the upper portion of the apparatus, taken on line 7—7 of FIGURE 3;

FIGURE 8 is a fragmentary plan view of the lower portion of the apparatus taken on line 9—9 of FIGURE 4;

FIGURE 9 is a fragmentary plan view of the lower portion of the apparatus taken on line 9—9 of FIGURE 4;

FIGURE 10 is an enlarged detail plan view of one of the underdrain baffle plates; and FIGURE 11 is an enlarged vertical sectional view of the baffle plate taken on line 11—11 of FIGURE 10.

Looking first at FIGURE 1, there is shown a flow diagram which incorporates the water-treating apparatus of this invention in a typical municipal water system where the water is being obtained from a deep well. In this system, the raw water is pumped from the well W to the aeration and filtration apparatus A. After aeration and filtration, the water is removed from the apparatus through a pipe system B and passed to use or storage, the distribution system including an elevated storage tank T (or a pneumatic storage tank) for maintaining distribution line pressure. The relative heights of tank T and apparatus A are not shown in correct proportions. Alternatively, the filtered water discharged through line B can be passed to a surface storage reservoir, and pumped from the reservoir to the service connections as required. This invention is concerned with the construction and operation of the apparatus A, and therefore this will now be described in detail.

Reference is made particularly to FIGURES 2, 3 and 4 in connection with the following description. In the preferred embodiment shown in the drawing, the apparatus A includes an elongated, vertically-extending tank 10 which provides an aeration section 11 in the upper portion thereof and a water detention section therebeneath. In the illustration given and as shown more clearly in FIGURE 4, the water detention section 12 extends to the base of the apparatus which is provided by a horizontally-extending base plate 13. The base plate 13 can be mounted on a concrete platform 14 which provides a sump 15 for collection and removal of waste and back-wash water from the apparatus.

The well connections and pump can also be mounted on platform 14. In the illustration given, pumps 16 and 17 are connected to separate wells which can supply the water either alternately or simultaneously to the water supply pipe 18, respectively, through valve-equipped branch pipe lines 19 and 20.

The pipe or conduit means 18 supplies the water to be treated to the upper portion of tank 10 and terminates at an inlet 21 at a point above aeration section 11. In the illustration given, pipe 18 extends horizontally through the side wall of detention section 12 and then turns upwardly through the center of the tank. A baffle cap 22 provided with a plurality of openings in the side walls thereof is mounted on the upper end of pipe 18 over inlet 21 to discharge the water with greater uniformity over the top of the aeration section 11 so that the water falls downwardly through the section.

Means are also provided for introducing air into tank 10 beneath the aeration section. In the illustration given, a plurality of baffled inlets 23 are provided in the side walls of tank 10 between the aeration section 11 and the water detention section 12. The air entering through inlets 23 passes upwardly through the aeration section 11. The desired flow of air is promoted by suitable fan or blower means, such as suction blower 24 which is mounted on the top of tank 10. As shown more clearly in FIGURE 8, the blower unit 24 includes a motor driven fan blade 25 which draws air in from the space within the tank 10 above aeration section 11 and discharges the air to the atmosphere through a grill 26. Since such suction blowers are well-known in the art, it is not believed necessary to further describe blower 24 herein.

Preferably, baffle means are provided within aeration section 11 to promote the contacting of the falling water with the upwardly-flowing air. For example, a plurality of superimposed baffle elements can be provided, such as splash trays 27. In the illustration given, the splash trays 27 are in the form of an aluminum mesh, as indicated more clearly in FIGURE 7. Other types of trays can also be used, such as redwood slat trays. In the illustration given, the superimposed mesh trays 27 are separated by support rings 28 and 29, and the entire assembly is supported by radially-extending arms 30, which are connected at their inner ends of pipe 18 and at their outer ends to the wall of tank 10.

In accordance with the present invention, a second tank section 31 is disposed below at least the upper portion of tank 10. In the embodiment shown, tank 31 is disposed around and encloses the lower portion of tank section 10, as shown more clearly in FIGURE 4. As shown, tank 10 is cylindrical, and tank 31 is of annular configuration, although other shapes can be employed, such as square or rectangular. With the construction illustrated, tanks 10 and 31 can have a common wall therebetween. In the illustration given, the inner wall of tank 31 is provided by the wall of tank 10. The base plate 13 also provides the bottom wall for the annular space within tank 31, while the top of tank 31 is provided with a separate cover 32. In certain applications, it may be desirable to provide a double wall and air space between tank 10 which contains raw water and tank 31 which contains filtered water.

The space within tank 31 is partitioned to provide a plurality of filter cells adapted to receive a filtration medium. In the illustration given and as shown more clearly in FIGURE 6, four equally-spaced, radially-extending partition walls 33 are provided to provide four filter cells 34. At the bottom of cells 34 but spaced upwardly from base plate 13, there is provided an underdrain plate 35 for supporting the filter medium while permitting the filtered water to drain through to the collection space 36 beneath the underdrain plate. The underdrain plate 35 is supported by radially-extending braces 37 which are provided with cut-out notches 38 along the lower edges thereof so that the annular space 36 is in open communication with the space beneath each of the filter cells.

As indicated in FIGURE 4, a filtration medium, such as a lower bed 39 of gravel and an upper bed 40 of fine filter media, can be supported on the underdrain plate 35. The fine filter media can be filter sand, pulverized coal, etc. As shown more clearly in FIGURE 9, the underdrain plate 35 is provided with a plurality of baffled outlets 42. As indicated more clearly in FIGURES 10 and 11, the baffled outlets 42 include an orifice 43 extending through the underdrain plate 35 and a baffle cap 44 which overlies opening 43 while having its side flanges supported a spaced distance from the surface of underdrain plate 35 to permit the filtered water to flow beneath the baffle cap 44 and downwardly through the orifice 43. Alternatively, other means can be provided for collecting the filtered water, such as a common pipe loop positioned within the lower portions of the cells or beneath the cells, and having inlets communicating with the lower portions of the cells.

For the proper operation of the apparatus, it is essential that the water detention section 12 of tank 10 extend to a level substantially above the top of the uppermost filter cells provided by tank 31, which tank may include a plurality of superposed tiers of filter cells as described in my co-pending application Serial No. 291,563, filed June 28, 1963. In the illustration given, the normal water level in detention section 12 is just below air inlets 23, as shown in FIGURE 3. In this connection, it is also important to provide valve control means for maintaining the desired level of the water in the detention section substantially above the top of the filter cells. More specifically, there is provided valve control means for regulating the rate at which the water to be treated is supplied to tank 10, and this valve control means is made responsive to the level of the water in detention section 12 to supply more water as the level of the water drops in the detention section 12. In the illustration given, this is accomplished by providing inlet pipe 18 with a butterfly valve 45. As shown in FIGURE 3, valve 45 can be located in the horizontally-extending section of pipe 18, and can be pivotally connected to a linkage arm 46, which in turn is pivotally connected to an upwardly-extending rod 47. In the illustration given, rod 47 is stabilized by brace 48, the outer end of which provides an opening slidably receiving the rod 47. A float 49 is mounted on the upper end of rod 47. Float 49 is hollow, and the weight thereof can be adjusted by adding or removing sand from the interior of the float, as indicated by the dotted line 50 in FIGURE 3.

In FIGURE 3, float 49 is shown in its extreme upward position, which corresponds with the maximum water level in detention section 12. In this position, butterfly valve 45 would be closed. As the level of water in the detention section falls, float 49 will move downwardly, and this will progressively open the valve 45 through the action of rod 47 and linkage 46. Water will therefore be supplied at a more rapid rate to the top of column 10 through the water inlet 21. In normal operation, this action tends to maintain a relatively uniform level of water within detention section 10, the variation of water level being modulated between the fully-closed and fully-open position of valve 45.

The elevated water level within detention section 12 will create a static pressure which can be utilized for forcing the aerated water through the filter cells 34 during normal filtration and during back-washing. The importance of detention section 12 in the back-washing operation will subsequently be described in greater detail.

To provide for the continuous filtration of the aerated water, there is also provided conduit or pipe means extending from the lower portion of tank 10 to the upper portion of tank 31 and including means for discharging the aerated water from the detention section 12 into the upper portions of the filter cells 34 to flow downwardly through the cells. In the illustration given, this is accomplished by a removal pipe 51 which extends from the bottom of detention section 12 through the water collection space 36 beneath underdrain plate 35 to the exterior of tank 31, as shown more clearly in FIGURE 4. If desired, the pipe connecting the detention section with the filter cells may extend along the outside of tanks 10 and 31. As shown more clearly in FIGURE 2, the external, upwardly-extending portion of pipe 51 divides into four valve-equipped legs or branches 52, 53, 54 and 55, respectively, connect to distributor pipes 60, 61, 62, and 63, as shown in FIGURES 5 and 6. As will be noted from FIGURE 6, one of the distributor pipes communicates with the upper portion of each of the filter cells 34, the portion of the distributor pipe within each cell being provided with an outlet opening means, such as ports 60a, 61a, 62a, and 63a.

There is also provided conduit or pipe means for removing the filtered water from within the collection space 36. In the illustration given, this consists of the pipe 64 which is equipped with a shut-off valve 65 and with a pump 66, as shown in FIGURES 2 and 5.

To provide for back-washing of the filter cells to clean the filter medium therein after it becomes dirty and clogged, conduit and valve means are provided to connect the upper portions of the filter cells with a drain for the discharge of waste water. As illustrated, a waste water outlet pipe 67, as shown particularly in FIGURE 5, is connected to outward extension of the branch pipes 60, 61, 62 and 63, and shut-off valves 68, 69, 70, and 71 are interposed between waste discharge line 67 and the respective branch lines. As shown in FIGURES 2 and 3, waste discharge pipe 67 terminates in a downwardly-extending section 67a which discharges into the sump 15.

Provision is also made for the drainage of the collection space 36 and tank 10. A drain pipe 72 connects by means of valve-equipped branch lines 72a and 72b respectively with collection space 36 and pipe 51, from detention section 12. Pipe 72 discharges into sump 15.

Operation

To a considerable extent, the operation of the apparatus A has already been indicated, but the method of operation will be summarized here to permit emphasis of certain operational features which may not heretofore have received sufficient emphasis.

During normal operation, water will be pumped into the top of column 10 through inlet pipe 18, the rate of flow being regulated by flow-control valve 45. The suction blower 24 will be operating, so that air is drawn through inlets 23 and passes upwardly through aeration section 11 in intimate contact with the downwardly-falling water. The aerated water is then held in detention section 12 for a period of time from several minutes to several hours, depending on the filtration flow rates. This permits the oxidation reactions to proceed for the more complete removal of the iron and manganese as insolubilized oxidation products, and also provides a static pressure head for passing the water into and through the filter cells.

The aerated water is removed from the bottom of tank 10 by means of the pipe 51, and is introduced to the top of the filter cells through the distributor pipes 60, 61, 62 and 63. For this purpose, the valves 56, 57, 58, and 59 will be open, while the valves 68, 69, 70, and 71 will be closed. It will also be understood that the valve in line 64 will be open, while the valve in line 72 will be closed.

The water passing downwardly through the filter cells 34 will collect in the underdrain space 36 and be removed through pipe 64 by means of pump 66. At this point, the water is ready for distribution to users. If desired, chemical treating agents can be introduced into the water while it is being held in detention section 12, such as reagents for chlorinating the water, etc. Therefore, the water will be completely treated as removed through pipe 64.

The apparatus as described herein includes provision for back-washing the filter cells one at a time, with the filtered water being produced by the other cells. To accomplish this result, valve 65 will be closed, as will one of the valves 56, 57, 58 or 59. For example, if valve 56 is closed, the corresponding valve 68 will be open, so that the pipe 60 is connected to the waste discharge line 67. With this arrangement, the water will continue to be filtered by the cells containing the distribution pipes 61, 62, and 63. The filtered water from collection space 36 will flow upwardly through the filter cell containing the distribution pipe 60 to back-wash the filter medium therein, and will be removed through the pipe 60 and discharged to waste through pipe 67.

Since it will usually be desirable to back-wash the cells at a much higher rate than the normal filtration rate, detention tank 12 can perform an important function during the back-washing. The water level in detention tank 12 can fall during back-washing until the valve 46 is wide-open, while still maintaining sufficient static head for the back-washing. By way of specific example, the normal flow rate for the filtration cells may be 3 gallons per square foot per minute (g.p.m./sf.), while the desired back-washing rate may be 13 g.p.m./sf. for the cell being backwashed. Assuming the pump supplying water to tank section 10 has a maximum delivery corresponding to a total filter flow rate of 13 g.p.m./sf., then the maximum flow can be utilized for backwashing by proportionately increasing the flow through the cells continuing to produce filtered water. However, if desired water from an outside source can be supplied directly to space 36 to provide part or all of the back-washing water.

Where greater filtration capacity is desired in relation to a given capacity of the detention tank section 10, tank section 31 can be expanded vertically to provide multiple superposed tiers of filtration cells as described in my copending application Serial No. 291,563, filed June 28, 1963; or the system can include one or more auxilliary or satellite filtration tanks arranged in side-by-side relations with respect to tank section 31, while being connected in parallel with respect to detention section 10.

While in the foregoing specification this invention has been described in relation to a specific preferred embodiment thereof, and many details have been set forth for the purpose of illustration, it will be apparent to those skilled in the art that the invention is susceptible to other embodiments and that many of the details described herein can be varied without departing from the basic principles of the invention.

I claim:

1. Packaged unit water filtration and aeration apparatus, comprising in unitary combination an elongated, vertically-extending tank providing an aeration section in the upper portion thereof and a water detention section therebeneath, conduit means including inlet means for supplying the water to be treated to said tank at a point above said aeration section so that the water falls downwardly through said aeration section, means for introducing air into said tank beneath said aeration section, blower means for causing said air to flow upwardly through said aeration section and including means for discharging air from said tank at a point above said aeration section, a second tank disposed below the upper portion of the said detention section of said first-mentioned tank, said second tank being equipped with partition means for providing a plurality of filter cells for receiving a filtration medium, the said water detention section of said first-mentioned tank extending to a level substantially above said filter cells, conduit means extending from the said detention section of said first-mentioned tank to the upper portion of said second tank and including means for discharging aerated water from said detention section into the upper portion of said filter cells to flow downwardly through said cells, means for removing the filtered water from beneath said filter cells, and valve control means for maintaining the level of the water in said detention section substantially above the top of said filter cells.

2. The apparatus of claim 1 wherein said valve control means includes means for regulating the rate at which the water to be treated is supplied to said first-mentioned tank, and wherein said last-mentioned means is responsive to the level of the water in said detention section to supply more water when the level of water in said detention section falls.

3. Packaged unit water filtration and aeration apparatus, comprising in unitary combination, a cylindrical, vertically-extending tank providing an aeration section in the upper portion thereof and a water detention section therebeneath, conduit means including inlet means for supplying the water to be treated to the upper portion of said tank aeration section, means for introducing air into said tank beneath said aeration section, blower means for causing said air to flow upwardly through said aeration section and including means for discharging air from said tank at a point above said aeration section, a second tank disposed below the upper portion of the said detention section of said first-mentioned tank, said second tank being equipped with partition means for providing a plurality of filter cells for receiving a filtration medium, the said water detention section of said first-mentioned tank extending to a level substantially above the top of said filter cells, conduit means extending from the lower portion of said first-mentioned tank to the upper portion of said second tank and including means for discharging aerated water from said detention section into the upper portions of said filter cells, means for removing the filtered water from beneath the filter cells, and valve control means for maintaining the level of the water in said detention section substantially above the top of said filter cells.

4. Packaged unit water filtration and aeration apparatus, comprising in unitary combination, a vertically elongated, cylindrical tank providing an aeration section in the upper portion thereof and a water detention section in the lower portion thereof, conduit means extending into the upper portion of said tank, inlet means associated with said conduit means for discharging the water to be treated into said tank at a point above said aeration section so that the water falls downwardly through said aeration section, means for introducing air into said tank between said aeration and detention sections, blower means for causing said air to flow upwardly through said aeration section and including means for discharging air from said tank at a point above said aeration section, a plurality of baffle means supported within said aeration section to promote the contacting of the falling water with the upwardly-flowing air, a second tank of annular configuration disposed around and enclosing the outside of the lower portion of said first-mentioned tank, said second tank being equipped with partition means for providing a plurality of filter cells for receiving a filtration medium, the said water detention section of said first-mentioned tank extending to a level substantially above the top of said filter cells, conduit means extending from the lower portion of said first-mentioned tank to the upper portion of said second tank and including means for discharging aerated water from said detention section into the upper portions of said filter cells to flow downwardly through said cells, means for removing the filtered water from beneath said filter cells, and valve control means regulating the rate at which the water to be treated is supplied to said first-mentioned tank, and said valve control means being responsive to the level of the water in said detention section to supply more water when the level of the water in said detention section falls.

5. Packaged unit apparatus for the sequential treatment of water by aeration, detention, and filtration, comprising in unitary combination, an elongated, vertically-extending tank providing an aeration section in the upper portion and a water detention section therebeneath, conduit means for supplying the water to be treated to the upper portion of said tank, inlet means associated with said conduit means for discharging said water at a point above said aeration section, means for introducing air into said tank beneath said aeration section, baffle means supported within said aeration section to promote the contacting of the falling water with the upwardly-flowing air, a second tank disposed around and enclosing the outside of the lower portion of said first-mentioned tank, said first-mentioned tank and said second tank having a common wall therebetween, said second tank being equipped with partition means for providing a plurality of filter cells for receiving a filtration medium, the said water detention section of said first-mentioned tank extending to a level substantially above the top of said filter cells, conduit means extending from the lower portion of said first-mentioned tank to the upper portion of said second tank and including means for discharging aerated water from said detention section into the upper portion of said filter cells to flow downwardly through said cells, means for removing the filtered water from beneath said filter cells, and valve control means for maintaining the level of the water in said detention section substantially above the top of said filter cells.

6. Packaged unit apparatus for the sequential treatment of water by aeration, detention, and filtration, comprising in unitary combination a vertically elongated, cylindrical tank providing an aeration section in the upper portion thereof, conduit means including inlet means for supplying the water to be treated to said tank at a point above said aeration section, means for introducing air into said tank beneath said aeration section, blower means for causing said air to flow upwardly through said aeration section and including means for discharging air from said tank at a point above said aeration section, baffle means supported within said aeration section to promote the contacting of the falling water with the upwardly-flowing air, a second tank of annular configuration disposed around and enclosing the lower portion of said first-mentioned tank, the inner wall of said second tank being provided by the outer wall of said first-mentioned tank, said second tank being equipped with partition means providing a plurality of filter cells for receiving a filtration medium, the said water detention section of said first-mentioned tank extending to a level substantially above the top of said filter cells, conduit means extending from the lower portion of said first-mentioned tank to the upper portion of said second tank and including means for discharging aerated water from said detention section into the upper portion of said filter cells to flow downwardly through said cells, means for removing the filtered water from beneath said filter cells, and valve control means for maintaining the level of the water in said detention section substantially above the top of said filter cells.

7. The apparatus of claim 6 wherein said valve control means includes means for regulating the rate at which the water to be treated is supplied to said first-mentioned tank, and wherein said last-mentioned means is responsive to the level of water in said detention section to supply more water to said first-mentioned tank when the level of the water in said detention section falls.

8. Packaged unit water filtration and aeration apparatus, comprising in unitary combination an elongated, vertically-extending tank providing an aeration section in the upper portion thereof and a water detention section therebeneath, conduit means including inlet means for supplying the water to be treated to said tank at a point above said aeration section so that the water falls downwardly through said aeration section, means for introducing air into said tank beneath said aeration section, blower means for causing said air to flow upwardly through said aeration section and including means for discharging air from said tank at a point above said aeration section, a second tank disposed below at least the upper portion of said first-mentioned tank, said second tank being equipped with partition means for providing a plurality of filter cells for receiving a filtration medium, the said water detention section of said first-mentioned tank extending to a level substantially above the top of said filter cells, conduit means extending from the said detention section of said first-mentioned tank to the upper portion of said second tank and including means for discharging aerated water from said detention section into the upper portion of said filter cells to flow downwardly through said cells, means for removing the filtered water from beneath said filter cells, valve control means for maintaining the level of the water in said detention section substantially above the top of said filter cells, said cells having a common underdrain means for collecting the filtered water from all of said cells, and conduit and valve means operative to back-wash one of said filter cells with filtered water from said common underdrain means while the rest of said cells continue to receive water from said detention section.

9. The apparatus of claim 8 wherein said valve control means includes means for regulating the rate at which the water to be treated is supplied to said first-mentioned tank, and wherein said last-mentioned means is responsive to the level of the water in said detention section to supply more water to said tank when the level of water in said detention section falls.

References Cited by the Examiner

UNITED STATES PATENTS

| | | | |
|---|---|---|---|
| Re. 20,469 | 8/1937 | Crawford | 261—2 |
| 350,679 | 10/1886 | Hyatt | 210—150 X |
| 477,491 | 6/1892 | Bell | 261—6 |
| 678,532 | 7/1901 | Bachman | 210—411 X |
| 2,207,272 | 7/1940 | Simons | 261—111 |
| 2,340,842 | 2/1944 | Reybold et al. | 210—151 |
| 2,508,618 | 5/1950 | Miner | 261—111 |
| 2,878,935 | 3/1959 | Magrath et al. | 210—411 X |
| 2,940,595 | 6/1960 | Crane | 210—333 |

HARRY B. THORNTON, *Primary Examiner.*

R. R. WEAVER, *Assistant Examiner.*